United States Patent [19]

Gillett et al.

[11] Patent Number: 4,625,123
[45] Date of Patent: Nov. 25, 1986

[54] LOAD SENSITIVE FUEL CUTOFF AND METHOD TO INCREASE ENGINE STABILITY

[75] Inventors: Daniel D. Gillett, Brooklyn Park; Raymond Stacherski, Anoka, both of Minn.

[73] Assignee: Onan Corporation, Minneapolis, Minn.

[21] Appl. No.: 654,631

[22] Filed: Sep. 24, 1984

[51] Int. Cl.[4] .............................................. H02P 9/04
[52] U.S. Cl. ................................ 290/40 B; 290/40 F; 290/51
[58] Field of Search ................... 290/17, 25, 34, 40 B, 290/40 F, 40 R, 51

[56] References Cited

U.S. PATENT DOCUMENTS

| | | | |
|---|---|---|---|
| 2,300,977 | 11/1942 | Schlaepfer | 290/40 R X |
| 2,909,671 | 10/1959 | Frederick | 290/40 R |
| 3,949,237 | 4/1976 | Neuers | 290/40 B |
| 4,423,307 | 12/1983 | Kondo et al. | 290/40 B X |

Primary Examiner—Bernard Roskoski
Assistant Examiner—W. E. Duncanson, Jr.
Attorney, Agent, or Firm—Merchant, Gould, Smith, Edell, Welter & Schmidt

[57] ABSTRACT

An assembly for stabilizing engine operation in an engine-generator set includes a fuel supply and fuel lines to first and second banks of engine cylinders. A fuel valve is positioned in the fuel line to the first bank of cylinders and is controlled by a normally open switch and a normally closed switch. In the closed position of the fuel valve the cylinders in the first bank act as a load on the cylinders in the second bank. The assembly includes a voltage sensor for sensing voltage generated by the engine-generator set. Once voltage exceeds a predetermined level, the sensor terminates fuel flow to the first bank. The assembly also includes a load sensor for sensing load imposed on the engine-generator set. Once the load increases above a first predetermined level, the load sensor allows flow of fuel to the first bank of cylinders and all cylinders are working. If the load drops below a second predetermined level, fuel flow to the first bank of cylinders is terminated and the cylinders in the first bank again function as a load on the cylinders in the second bank. The method of increasing engine stability includes terminating fuel flow to the first bank of cylinders upon the engine reaching operating speed with no load. As a load of a first predetermined amount or greater is placed on the engine-generator set, fuel flow is reinstated to the first bank and all cylinders are working. As load drops below a second predetermined level, flow is again terminated and the first bank of cylinders functions as a load on the second bank.

17 Claims, 3 Drawing Figures

LOAD SENSITIVE FUEL CUTOFF AND METHOD TO INCREASE ENGINE STABILITY

BACKGROUND OF THE INVENTION

A. Field of the Invention

The present invention relates to a new and improved assembly for increasing engine stability and to a new and improved method therefor; and more particularly, to a new and improved load sensitive fuel cutoff for imposing a load on a diesel engine in an engine-generator by cutting off fuel to one or more engine cylinders and to a method for cutting off fuel to one or more cylinders in a diesel engine at predetermined loads on the engine thereby increasing engine stability at no load and light load situations.

B. Description of the Background Art

In certain situations such as hospitals, nursing homes, construction sites, and recreational vehicles an auxilliary source of electricity is necessary. For example, in hospitals standby electrical power provided by engine-generator sets which include a diesel engine and a generator are necessary to provide electricity in emergency situations when normal power has been interrupted. In situations in which a source of electricity is not readily available such as at construction sites and with recreation vehicles, an engine-generator set provides necessary electricity to run equipment.

In these and other uses of engine-generator sets engine stability is an absolute necessity to maintain the frequency of the alternating current produced by the generator constant. An engine is stable while it runs at a constant rpm. In an unstable mode the engine wanders from a constant rpm in a cyclic hunt for operating speed. Engine instability is particularly undesirable in situations requiring a plurality of parallel engine-generator sets. For example, hospitals require large power backup of a magnitude not available from a single engine-generator set. To have available the necessary emergency power, more than one engine-generator set is connected in parallel. When auxilliary or emergency power is required, each engine-generator set is started and they must quickly reach the same frequency, phase, and speed in order to be coupled to a buss. Existing regulations require all engine-generator sets to come on line within ten seconds. If one or more of the engine-generator sets includes an unstable engine, that engine will unsuccessfully hunt for the operating speed preventing the engine-generator sets from coming on line.

A desired procedure for improving engine stability is to improve the combustion process of the engine. Recently, however, it has been desireable to obtain increased horsepower from engines for the same displacement by increasing fuel consumption and decreasing compression ratios. With reduced compression ratios, heat generated in the engine at start up is low. Low heat results in low engine temperature and poor combustion which causes engine instability. One way to avoid engine instability at start up is to preheat the engine but it has proven difficult to heat engines sufficiently to overcome this problem.

It is also typical with engines in generator sets to have instability at operating speed with no or little load. These engines are designed to operate under a load and if there is no or little load at operating speed, the engine does not heat up to the preferred level. The low heat results in low engine temperature and poor combustion causing engine instability.

It has been determined that engine instability at start up and at operating speed with no or little load can be corrected if a load is applied to the engine. By applying a load the engine heats up quickly and runs hotter resulting in improved combustion and engine stability. The most direct procedure for imposing a load on an engine is to stop the flow of fuel to one or more of the cylinders. The inactive cylinders act as air compressors and consume work whereas a fueled or active cylinder creates more work than it consumes. The additional work imposed on the fueled cylinders increases engine temperature improving combustion and allowing stable engine operation.

Several approaches to impose a load on an engine have been unsuccessfully attempted. One approach employs a check valve in one or more fuel lines of the engine. At low engine speeds the check valve prevents fuel flow to one or more of the cylinders. A check valve has been found to be too restrictive, and in generator sets it has been found that the check valve does not allow sufficient fuel flow to the active cylinders.

Another approach involves a pressure sensitive switch in one or more of the engine fuel lines. These switches measure pressure of the fuel from the fuel pump. Switches of this type have proven unsatisfactory because when the fuel lines to the inactive cylinders are opened, the change in fuel pressure causes the switch to cycle resulting in engine instability.

There is a substantial need to introduce a load onto an engine in an engine-generator set that will increase engine stability during engine start up and at operating speeds with no or little load.

SUMMARY OF THE INVENTION

An object of the present invention is to provide a new and improved system for maintaining stable engine operation during no load and light load situations.

Another object of the present invention is to provide a new and improved system for improving engine stability by controlling fuel flow to one or more engine cylinders.

Still another object of the present invention is to provide a new and improved load sensitive fuel cutoff for engines wherein a cutoff senses external load on the engine and adds load at full operating speed if there is no external load or if external load on the engine drops below a predetermined level.

A further object of the present invention is to provide a new and improved method for maintaining stability of diesel engines in engine-generator sets at start up and at operating speed with no or light loads.

An additional object of the present invention is to provide a load sensitive fuel cutoff in an engine-generator set that at operating speed of the engine, cuts out one or more of the engine cylinders, cuts in these cylinders at or above a predetermined external load imposed on the engine and cuts out one or more of these cylinders upon the external load dropping below a second predetermined load.

Briefly, the present invention is directed to a new and improved load sensitive fuel cutoff for an engine in an engine-generator set. The fuel cutoff maintains engine stability at operating speed with no or light loads and at start up. The cutoff system includes a solenoid actuated fuel valve positioned in one or more fuel lines in an engine to control flow of fuel to one or more engine cylinders. The system further includes a normally closed switch controlled by a voltage sensor which senses voltage generated by the generator, and a normally open switch controlled by a load sensor which senses power (watts) or current generated by the generator. After engine start up, at a predetermined voltage level developed by the generator, the voltage sensor opens the normally closed switch deactivating one or more of the engine cylinders. As an external load is imposed on the engine-generator set and attains a first set point or predetermined level or greater, the load sensor closes the normally open switch and the fuel valve activates all engine cylinders. The engine continues to run on all cylinders until the external load drops to a second set point or predetermined level or below, whereupon the load sensor opens the normally open switch deactivating one or more of the engine cylinders. The engine continues to operate with the deactivated cylinders until the engine-generator set is tuned off or the external load increases to or above the first predetermined level.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DETAILED DESCRIPTION OF THE PREFERRED EMBODIMENT

Figure 1:
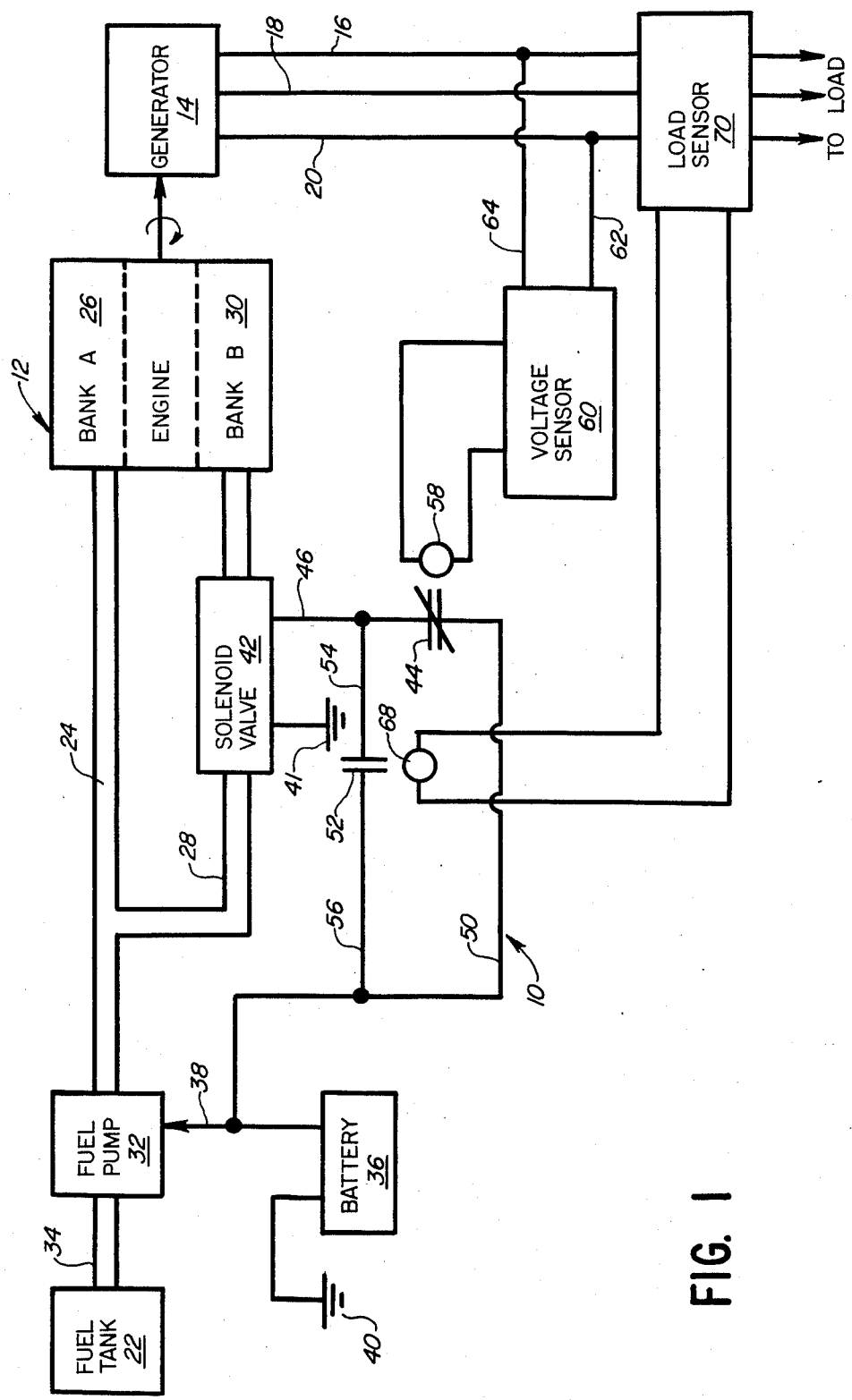
FIG. 1 is a block diagram illustrating an engine-generator set utilizing a stability enhancing system constructed in accordance with the principles of the present invention.

Referring to the drawings and initially to FIG. 1, there is illustrated an engine-generator set generally designated by the reference numeral 10. Engine-generator set 10 may be used as a secondary source of electricity as, for example, a source of electricity usable during emergencies caused by power outages in hospitals or nursing homes. The set 10 may also be used as the primary source of electricity for construction sites or recreational vehicles. For these uses unstable operation of the engine 12 in engine-generator set 10 is undesirable.

It has been found that instability often occurs in engines of the type best suited for engine-generator sets 10 during no load or light load situations and at start up. The present invention is directed to improving engine stability for engines such as the Cummins VTA-1710-G2 twelve cylinder diesel engine; however, any engine that may be used in engine-generator sets is within the scope of the present invention.

Typical engine-generator sets such as the illustrated set 10 includes a generator 14 directly coupled to engine 12. Through this coupling rotation of engine 12 rotates generator 14 to produce electricity. In the illustrated embodiment, generator 14 is a three phase generator with three wires or lines 16, 18 and 20 extending to a load; however, various generators including AC or DC generators or single phase or multiple phase or combination of the above may be used.

To provide fuel to engine 12, a fuel supply or tank 22 is connected by a first fuel line 24 to a first bank or group of engine cylinders 26. A second fuel line 28 branches off fuel line 24 and supplies fuel to a second bank or group of cylinders 30. Each bank of cylinders 26 and 30 includes at least one cylinder and may include more. In addition, there may be more than two banks of cylinders depending on the routing of fuel lines through engine 12. For example, there are existing engines with a separate fuel lines for each cylinder and other engines with a fuel line serving several cylinders. The present invention is adaptable to any of these engines.

A fuel pump 32 is connected to the fuel supply 22 by a fuel line 34. The fuel pump 32 is also connected to fuel line 24 and pumps fuel to engine 12, and specifically first bank 24 and a second bank 30 through line 24. Battery 36 is grounded at a ground point 40.

It has been determined that engine instability is unexpectedly removed if a load is applied to engine 12 during start up or no load and light load situations. The present invention adds a load to engine 12 by terminating fuel to the second bank of cylinders 30. The inactive cylinders in the second bank 30 function as air compressors consuming work whereas the active or fueled cylinders in first bank 26 create more work than they consume. The work required to reciprocate the non-fueled cylinders is a load on the remaining fueled cylinders in first bank 26 and the increased load causes engine 12 to heat up, thereby improving the combustion process and eliminating engine instability.

Figure 3:
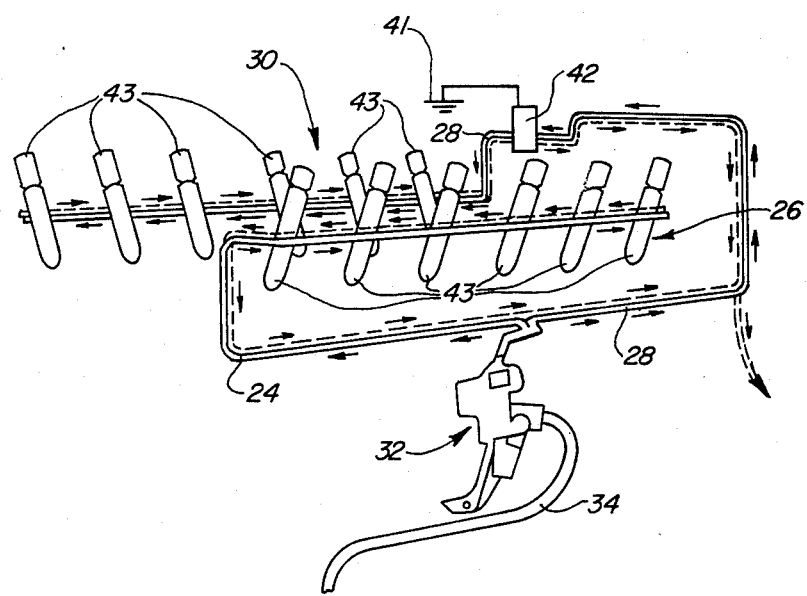
FIG. 3 is a fuel flow schematic for a twelve cylinder diesel engine including a solenoid controlled fuel valve which is a component of the present invention.

Control of fuel to the second bank of cylinders 30 is provided by a solenoid actuated fuel valve 42 that is grounded at a ground point 41. Fuel valve 42 is positioned in fuel line 28 and controls the flow of fuel therethrough. As illustrated in FIG. 3, each of the cylinders in first 26 and second 30 banks includes a fuel injector 43 that injects fuel from line 24 or 28 into one of the cylinders. In FIG. 3, bank 30 is illustrated as including six injectors 42. As previously mentioned, the number of cylinders can be one or several and the selection of six is not intended as limiting. As illustrated, fuel valve 42 is positioned in fuel line 28 to control fuel to injectors 43 in the second bank 30.

Fuel valve 42 is connected to battery 36 through a first normally closed switch or contact 44 and lines 46 and 50 and 38. Fuel valve 42 is also connected to battery 36 through a normally open switch or contact 52 and lines 46, 54, 56, 50 and 38.

First switch 44 includes and is actuated by a coil 58 driven by a voltage sensor 60. Voltage sensor 60 may be a voltage build up relay that senses voltage generated by generator 14. This is accomplished by sensing the voltage between one of the lines 16, 18 and 20 and ground or between two or more of the lines 16, 18 and 20. In the illustrated embodiment the voltage sensor 60 senses the voltage between the lines 16 and 20 via lines 62 and 64. The second switch 52 includes and is operated by a coil 68 driven by a load sensor 70. The load sensor 70 may be directly or inductively coupled to lines 16, 18 and 20 and measures power (watts) or current. Although the switches 44 and 52 are illustrated as electro-mechanical switches operated by the coils 58 and 68, solid state switches such as transistors, silicon controlled switches or other appropriate devices may be used.

Figure 2:
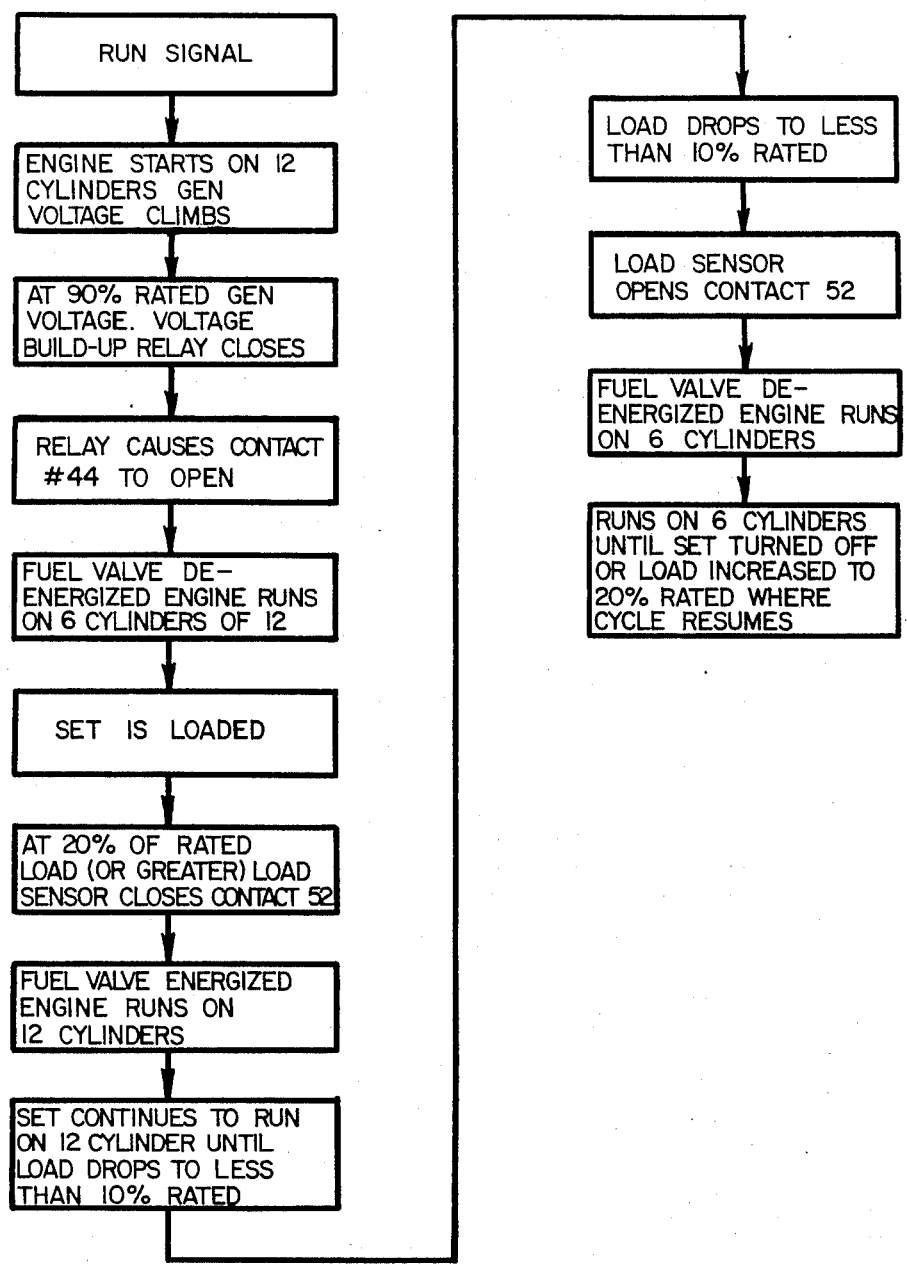
FIG. 2 is a flow chart illustrating the sequence of operation of an engine-generator set utilizing the present invention.

Operation of engine-generator set 10 is best understood by reference to FIG. 2. In FIG. 2 a flow chart of the operation of set 10 is illustrated. To commence operation of set 10 is a run signal is initiated that start engine 12 with all cylinders in the first bank 26 and second bank 30 operating.

As engine 12 begins to operate voltage generated by generator 14 climbs until reaching a predetermined level. It has been determined that for a Cummins VTA-1710-G2 engine the level of operating speed of engine 12 with no load at which instability begins to occur is at approximately 90% of the rated generator voltage. This level will vary with different engines and models and is not intended to be limiting on the invention. At approximately 90% of the rated voltage, voltage sensor 60 energizes coil 58 to open first switch 44. Opening switch 44 deenergizes solenoid valve 42 and terminates the flow of fuel to the second bank of cylinders 30. In the preferred embodiment, there are six cylinders in second bank 30 and in the operating speed, no load mode, engine 12 is operating on six active cylinders with six inactive cylinders imposing a load, the effect of which is to remove engine instability. It is to be understood fewer than six cylinders or more than six cylinders may be deactivated depending on the engine and the particular situation.

Engine-generator set 10 is now loaded. At a first predetermined level (set point) or greater of the rated load for set 10, load sensor 70 energizes coil 68 to close switch 52. This first set point corresponds to an operational load on engine 12 under which engine 12 will run in a stable condition. In the preferred embodiment, it has been determined the first predetermined load for a Cummins VTA-1710-G2 engine is approximately 20% of the rated load. This level will be different for different engines and different models and is not intended to be limiting. With switch 52 closed, solenoid valve 42 is actuated to an open position allowing fuel to flow to the second bank of cylinders 30 and engine 12 operates on all cylinders.

Engine 12 will continue to operate on all cylinders until a light load at operational speed is imposed. In this mode the load drops to or below a second predetermined level (set point). In the preferred embodiment this second set point is approximately 10% of the rated load. This level, as with the first predetermined level of 20%, is specific to the Cummins VTA-1710-G2 engine and may vary with different engines and models. Once load drops to approximately 10% of the rated load or below, load sensor 70 deenergizes coil 68 opening switch 54. Fuel valve 42 is closed, thus terminating flow of fuel to the second bank 30 of cylinders. In this operational speed, light load mode engine 12 operates on the cylinders in the first bank 26. The engine-generator set 10 runs in this condition until it is turned off or the load is increased above the first set point of approximately 20% of rated load whereupon the cycle resumes. The feature of load sensor 70 including two predetermined levels or set points (approximately 20% and 10%) provides the advantage of preventing the engine 12 from oscillating between operation on both banks of cylinders 26 and 30 and operation on only the first bank 26 which would occur if there were only one set point or predetermined level.

Engine-generator set 10 as described aids in stable engine operation in no load or light load situations at the operational speed of engine 12 and at start up with no load. The present invention allows several engine-generator sets to be joined in parallel within the ten seconds required by regulations by avoiding hunting or cycling. The enginegenerator set 10 accomplishes engine stability without the addition of substantial equipment or controls thereby increasing reliability and reducing cost.

Many modifications and variations of the present invention are possible in light of the above teachings. Thus, it is to be understood that, within the scope of the appended claims, the invention may be practiced other than as specifically described.

What is claimed and sought to be secured by Letters Patent of the United States is:

1. A load sensitive fuel cutoff for at least one cylinder in a multi-cylinder engine included in an engine-generator set, said engine-generator set including said engine, a generator and a fuel supply, comprising:
   first means communicating a first group of said cylinders to said fuel supply,
   second means communicating a second group of said cylinders to said fuel supply,
   a fuel flow control valve in said second communicating means, and
   means for sensing load on said engine, said load sensing means operable to actuate said flow control valve to close communication of said fuel supply to said second group of cylinders upon said load dropping to a first predetermined level and opening communication upon said load being above a second predetermined level.

2. The load sensitive fuel cutoff set forth in claim 1 wherein said load is an electrical load and said first and second predetermined load levels being of different magnitudes.

3. The load sensitive fuel cutoff set forth in claim 1 wherein said flow control valve is a solenoid controlled valve.

4. The load sensitive fuel cutoff set forth in claim 1 said cutoff further includes voltage sensing means for sensing voltage from said generator and actuating said flow control valve to close communication of said fuel supply to said second group of cylinders upon voltage from said generator reaching a predetermined level.

5. The load sensitive fuel cutoff set forth in claim 1 wherein said fuel flow control valve is a solenoid actuated valve; said fuel flow control valve is connected to a first, normally closed switch and to a second, normally open switch; means for sensing the voltage generated by said generator; means for sensing the load imposed on said engine; said voltage sensing means opening said first switch and closing said fuel flow valve upon said voltage being above a predetermined level, said load sensing means closing said second switch and opening said fuel flow valve upon said load exceeding a first predetermined level and opening said second switch to close said fuel flow valve upon said load dropping below a second predetermined level.

6. A method for providing stable engine operation in an engine-generator set wherein said engine includes at least first and second banks of cylinders, each bank including at least one engine cylinder, a fuel supply, first and second fuel lines communicating the fuel supply with said first and second banks of cylinders, respectively, and a fuel valve means for controlling fuel flow through said first fuel line, the steps comprising:
   opening said fuel valve means,
   starting said engine,
   closing said fuel valve means at a first predetermined load or less to terminate communication of fuel to said first bank of cylinders, and opening said fuel valve means at a second predetermined load or greater allowing communication of fuel to said first bank of cylinders.

7. The method claimed in claim 6 wherein said first and second predetermined loads are electrical loads of different magnitudes.

8. The method claimed in claim 7 further comprising the steps of:
sensing voltage generated by said enginegenerator set,
closing said valve means, and
terminating communication of fuel to said first bank of cylinders upon said voltage attaining a predetermined level.

9. The method claimed in claim 6 wherein said step of sensing a load on said engine comprises measuring the current generated by said engine-generator set.

10. An assembly for maintaining engine stability in an engine-generator set, wherein said engine is a diesel engine including at least first and second banks of cylinders, each said bank including at least one cylinder, said assembly comprising:
a fuel supply for said engine in said engine-generator set,
a fuel line communicating said fuel supply to said first and second banks,
a fuel valve in said fuel line controlling fuel flow to said second bank of cylinders,
means for opening and closing said fuel valve,
means for sensing the electrical load on said engine-generator set and opening said fuel valve when said load is above a first predetermined level and closing said fuel valve when said load is below a second predetermined level.

11. The assembly set forth in claim 10 further comprising means for sensing the voltage generated by said engine-generator set and closing said fuel valve when said voltage is above a predetermined level and said load is below said first predetermined level.

12. The assembly set forth in claim 10 wherein said load sensing means senses current generated by said engine-generator set.

13. The assembly set forth in claim 10 wherein said load sensing means includes a coil and a normally open switch controlling said fuel valve.

14. The assembly set forth in claim 11 wherein said voltage sensing means includes a coil and a normally closed switch controlling said fuel valve.

15. The assembly set forth in claim 11 wherein said voltage sensing means includes a voltage buildup relay.

16. The assembly set forth in claim 10 wherein said fuel valve comprises a solenoid actuated valve.

17. A method of maintaining engine stability in an engine-generator set wherein the engine in said engine-generator set includes first and second banks of cylinders, the steps comprising:
starting said engine with said first and second banks of cylinders operating,
measuring the voltage generated by said engine generator set,
terminating the flow of fuel to said first bank of cylinders upon said engine attaining operating speed with no or light load,
sensing the electrical load on said engine,
commencing flow of fuel to said first bank of cylinders upon the load on said engine reaching a first predetermined level,
maintaining flow of fuel to said first and second banks of cylinders while said load is at or exceeds said first predetermined load, and
terminating flow of fuel to said first bank of cylinders upon said load dropping to or below a second predetermined level.

* * * * *